United States Patent [19]
Sinnhuber et al.

[11] Patent Number: 5,556,128
[45] Date of Patent: Sep. 17, 1996

[54] SAFETY ARRANGEMENT FOR A VEHICLE OCCUPANT

[75] Inventors: Ruprecht Sinnhuber, Gifhorn; Helmut E. Müller, Isenbüttel, both of Germany

[73] Assignee: Volkswagen AG, Wolfsburg, Germany

[21] Appl. No.: 527,080

[22] Filed: Sep. 12, 1995

[30] Foreign Application Priority Data

Nov. 24, 1994 [DE] Germany .............. 44 41 818.3

[51] Int. Cl.$^6$ .................................. B60R 21/22
[52] U.S. Cl. .............. 280/730.2; 280/736; 280/739; 280/743.1
[58] Field of Search .............. 280/730.1, 730.2, 280/743.1, 729, 736, 739, 742, 728.2, 733

[56] References Cited

U.S. PATENT DOCUMENTS

| | | | |
|---|---|---|---|
| Re. 34,204 | 3/1993 | Takada | 280/739 |
| 3,642,303 | 2/1972 | Irish et al. | 280/730.1 |
| 4,262,931 | 4/1981 | Strasser et al. | 280/729 |
| 4,359,200 | 11/1982 | Brevard et al. | 280/730.2 |
| 5,112,079 | 5/1992 | Haland et al. | 280/730.2 |
| 5,161,821 | 11/1992 | Curtis | 280/730.2 |
| 5,193,847 | 3/1993 | Nakayama | 280/739 |
| 5,273,309 | 12/1993 | Lau et al. | 280/730.2 |
| 5,348,342 | 9/1994 | Haland et al. | 280/730.2 |

FOREIGN PATENT DOCUMENTS

| | | |
|---|---|---|
| 0611684A1 | 2/1994 | European Pat. Off. . |
| 3741637C2 | 12/1987 | Germany . |
| 4019596A1 | 6/1990 | Germany . |
| 4307421A1 | 3/1993 | Germany . |
| 4307175A1 | 3/1993 | Germany . |
| 4217174 | 11/1993 | Germany . |
| 3276844 | 3/1991 | Japan . |
| 4-24142 | 1/1992 | Japan .............. 280/730.1 |
| 5-208647 | 8/1993 | Japan .............. 280/730.2 |
| 6-227348 | 8/1994 | Japan .............. 280/730.2 |

*Primary Examiner*—Paul N. Dickson
*Attorney, Agent, or Firm*—Brumbaugh, Graves, Donohue & Raymond

[57] ABSTRACT

A safety arrangement for protecting a vehicle occupant during a side collision provides airbags laterally adjacent to the head and torso portions of the occupant. The airbags are fillable with propellant gas by at least one gas generator contained in the same unit as the airbags in response to a signal from a collision sensor connected to a control unit. To permit the airbag arrangement to be as small in volume as possible, the airbags may be combined in one unit. The airbags are deployable forwardly in the direction of view of the occupant and, when filled, have a substantially C-shaped contour in side view. The unit containing the airbags and the gas generator may be mounted either in a vehicle component or on a structural part of the vehicle.

20 Claims, 3 Drawing Sheets

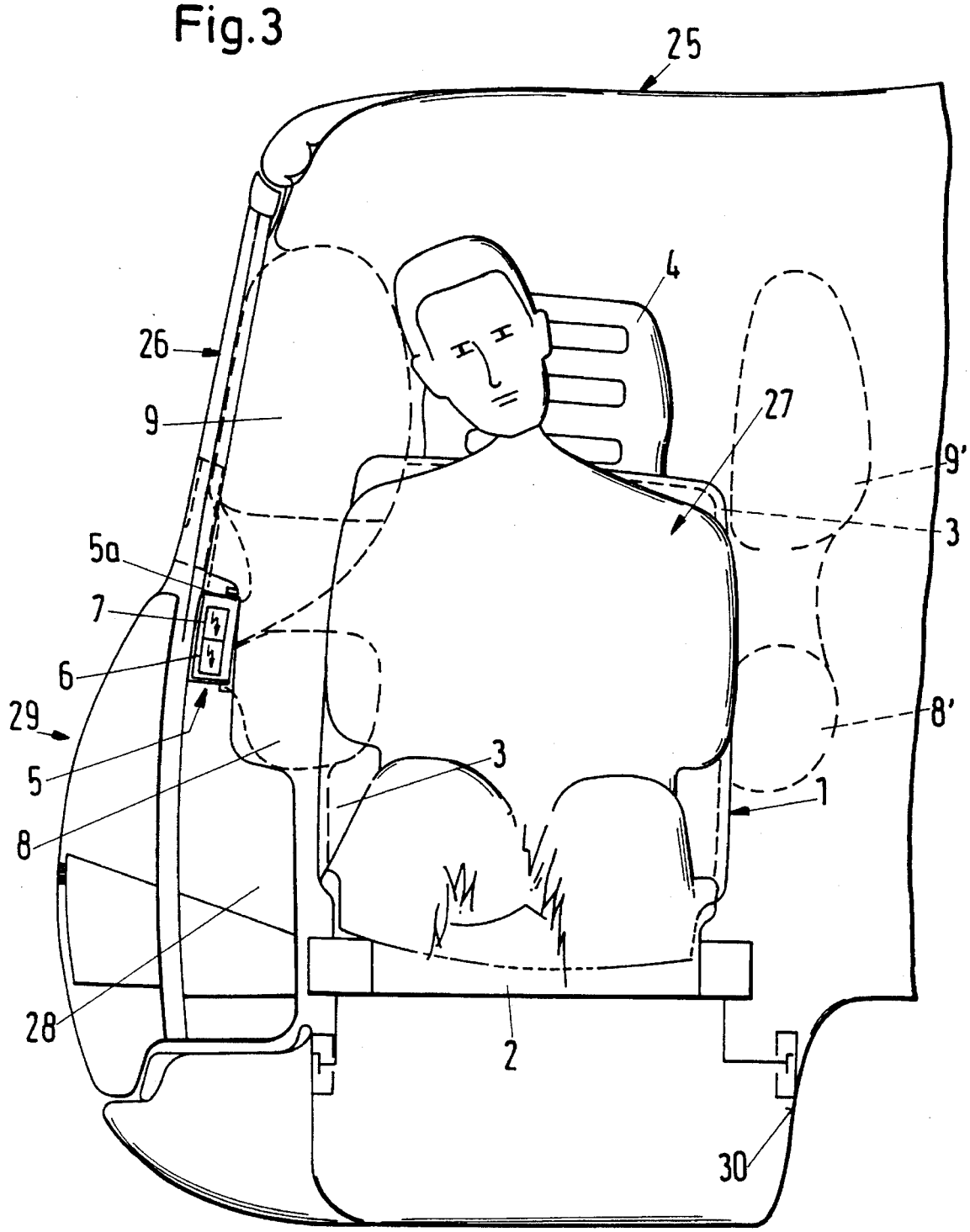

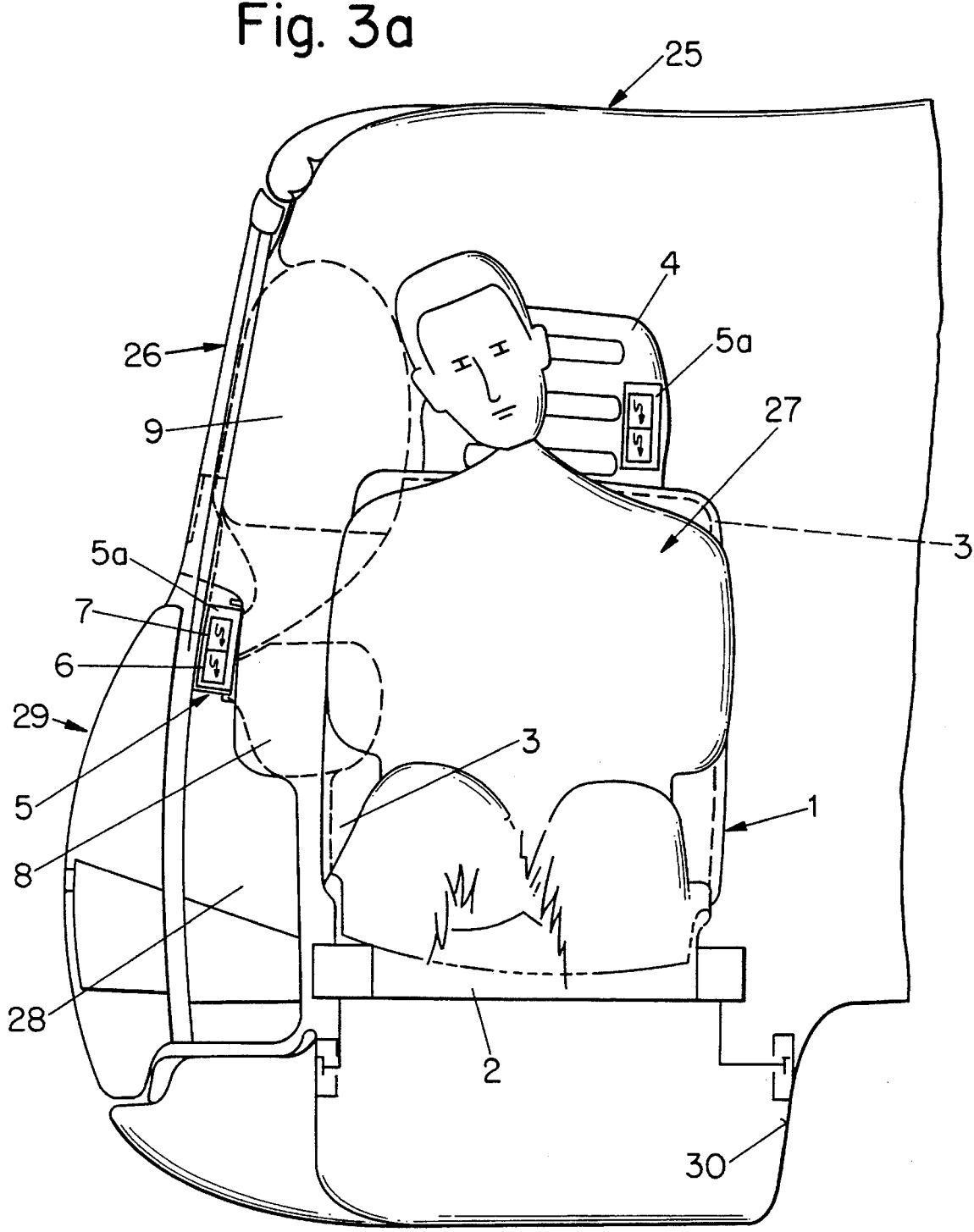

SAFETY ARRANGEMENT FOR A VEHICLE OCCUPANT

BACKGROUND OF THE INVENTION

This invention relates to safety arrangements providing lateral head and body protection for vehicle occupants.

Lateral safety arrangements for protecting vehicle occupants in a side collision have been disclosed in a wide variety of embodiments. Such arrangements are disclosed, for example, in Japanese patent publication No. 3-276844 and German Offenlegungsschrift No. 43 07 175. Further lateral occupant protection arrangements are disclosed in European Application No. 0 611 684 and German Offenlegungsschrift No. 37 41 637, in which airbags are arranged primarily for protection of the occupant's head. The airbags shown in German Offenlegungsschrift Nos. 40 19 596 and 43 07 421, by contrast, serve primarily to restrain the occupant's upper body.

SUMMARY OF THE INVENTION

Accordingly, it is an object of the present invention to provide a safety arrangement for vehicle occupants which overcomes disadvantages of the prior art.

Another object of the invention is to provide effective protection for vehicle occupants in a lateral collision by an airbag arrangement that will permit the use of airbags of the least possible volume, and will also permit individual adaptation to the ergonomics of an occupant positioned in a vehicle seat.

These and other objects of the invention are attained by providing an occupant safety arrangement including an airbag assembly containing one or more airbags and a propellant mounted as a unit at the side of the occupant of a seat and arranged upon activation to project one or more airbags forwardly in a generally C-shaped configuration having portions adjacent to the head and to the torso of the seat occupant.

An important feature of the invention is that head and torso airbag portions and an airbag filling arrangement including at least one gas generator are combined into a single unit. In this way, a module is provided that will assure adequate support for both the head and the torso of the seat occupant in a lateral collision. According to another feature of the invention, the airbag arrangement is deployable forwardly, in the occupant's direction of view, and configured so that an airbag portion will be inflated only where lateral support for the occupant's body is required. According to still another feature of the invention, the airbag arrangement is stitched, or is connected to belts fastened to the seat or the vehicle structure, so as to form a more or less C-shaped contour in side view. Thus, the airbag arrangement does not engage the seat occupant over his entire side surface. The restraining function of the airbag arrangement is effectively restricted to those parts of the body which, given the location of the center of gravity of the body, are adequate for proper lateral support. This applies also and especially to protection against a potential head impact in the region of the so-called B- or C-column of the vehicle when the airbag assembly is integrated with a seat back. The unit containing the assembly of one or more airbags and a propellant may alternatively be attached to a vehicle installation or component such as a central tunnel or headrest or to a structural part of the vehicle such as a door or B- or C-column. Preference is given, however, to mounting the unit in the back of a vehicle seat because, when the seat is shifted, the spatial positioning of an airbag to an occupant is independent of the position of the seat in the vehicle.

In an embodiment of especially simple design, head, chest and pelvic airbags are combined in a single restraining cushion and the filling of this single restraining cushion is effected with only one gas generator. In this arrangement, the cushion part associated with the chest and/or the pelvis is filled first, and then the cushion part associated with the head is filled. Since the head of the occupant is, as a rule, more distant from the side of the vehicle than the chest region, the full deployment of the head airbag can be delayed compared to the deployment of the chest airbag.

Another important feature is the design of the airbag arrangement so that, after full deployment and support of the occupant, there are different relaxation rates for different airbag portions. Thus, for example, a very firm material should be selected for the chest/pelvis airbag portion which is capable of absorbing a high energy but also of collapsing more quickly. The relaxation behavior in each instance may be adjusted by selecting an appropriate permeability for the airbag material and, alternatively or supplementarily, by bag vents. By contrast, the head airbag portion may be made of a less firm material compared to the chest/pelvis airbag portion because the forces exerted by the head are substantially lower. What is desirable in the head portion is a longer staying time compared to the chest/pelvis portion so that the head can be held longer in its natural position.

Likewise important is the provision of a prepositioning arrangement for the airbag and propellant unit. This prepositioning arrangement is especially useful if the unit is fastened to a vehicle part such as the vehicle door, the central tunnel, or a substantially vertical post such as the B-column, which is a fixed position in the vehicle and not adjustable with the vehicle seat. Such mounting of the unit on a fixed vehicle part would normally require the provision of an airbag arrangement of correspondingly larger construction in order to protect the occupant at every position of the vehicle seat.

BRIEF DESCRIPTION OF THE DRAWINGS

Further objects and advantages of the invention will be apparent from a reading of the following description in conjunction with the accompanying drawings, in which:

FIG. 3 is a front view of a vehicle seat showing an arrangement with the occupant protection unit mounted in a door of the vehicle; and FIG. 3a is a view similar to FIG. 3 showing an alternative form of the invention.

DESCRIPTION OF PREFERRED EMBODIMENTS

Figure 1:
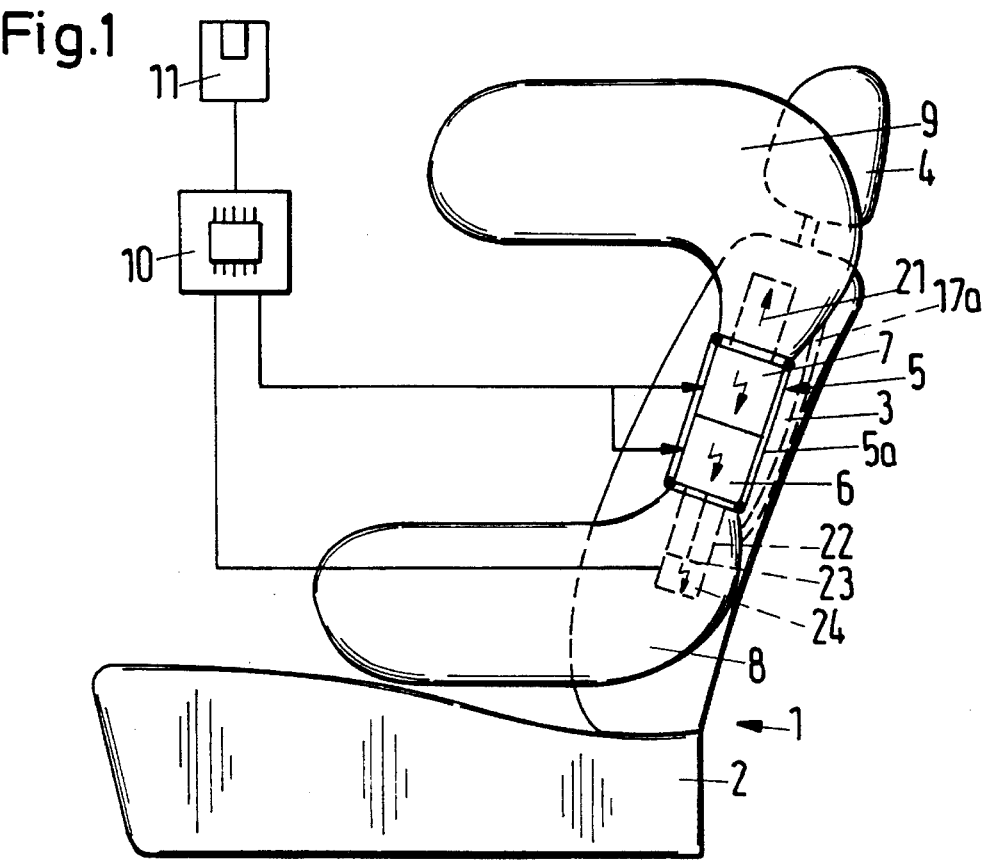
FIG. 1 is a side view of a vehicle seat illustrating a first embodiment of the invention incorporating two gas generators.

In each of the drawing figures, the same parts are designated with the same reference numerals.

In the typical embodiment of the invention shown in FIG. 1, a vehicle seat 1 has a seat cushion 2, a back 3 and a headrest 4. A propellant arrangement 5 mounted on a frame of the back 3 includes two gas generators 6 and 7 in a common housing 5a. The gas generators are arranged to fill firstly a torso airbag 8 to support the pelvic and/or chest region of a seat occupant, and secondly a head airbag 9.

Inflation of the airbags 8 and 9 is triggered by a control unit 10 which is connected to the gas generators 6 and 7 and is also connected to a collision sensor 11. In a preferred embodiment of the invention, the airbags 8 and 9 are included as a unit with the propellant arrangement inside the housing 5a and are positioned substantially in the region of a lateral wing of the back rest 3. Protection of two occupants seated side-by-side in adjacent seats can be effectively provided if a unit of the type described above is provided on both sides of the seat back 3 as described hereinafter with respect to FIG. 3.

As clearly shown in FIG. 1 the projection of the airbags 8 and 9 upon inflation is primarily forwardly in the direction of view of the occupant so as to generate an essentially C-shaped configuration, as seen from the side, so that the seat occupant's body can be supported by regional contact with both the head and the lower torso. Depending on the particular shape of the airbag arrangement and the installation in the vehicle, however, there may be, alternatively, an at least partially regional support of the chest portion of the occupant as shown for example in FIG. 2 which includes an airbag arrangement 12 protruding forwardly from the seat 1 beyond the contour of the back in the chest region of the occupant.

Figure 2:
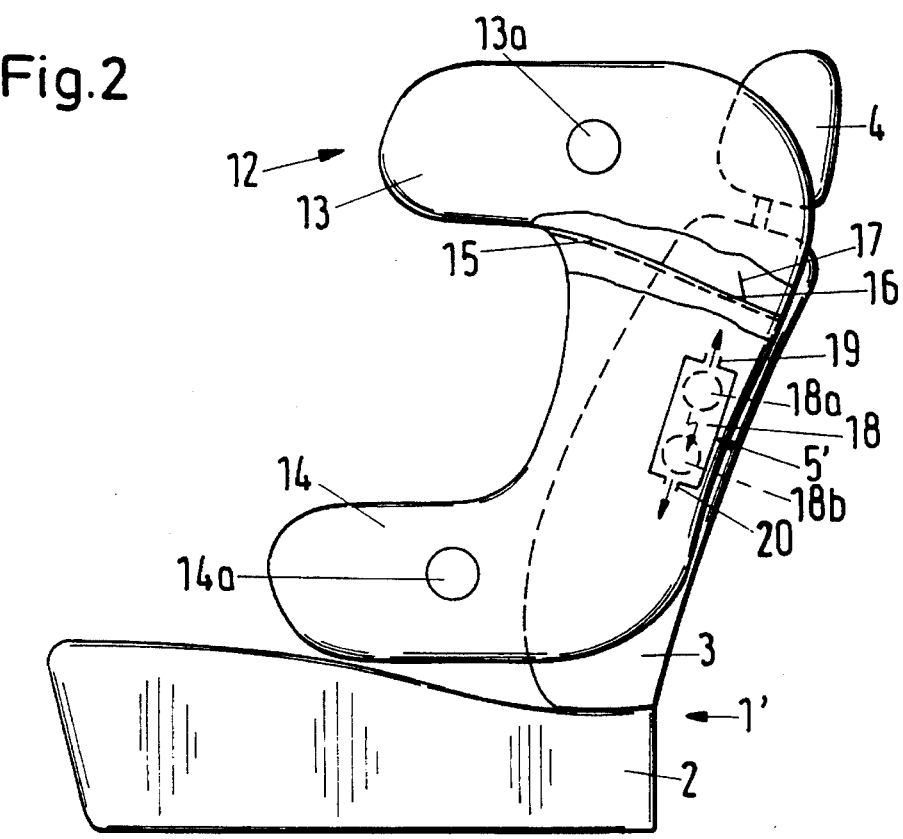
FIG. 2 is a side view of a vehicle seat showing a second embodiment of the invention utilizing a single gas generator.

In the airbag arrangement 12 of FIG. 2, an integral gas cushion includes a head compartment 13 and a torso compartment 14 which are separated from each other by a transverse internal seam 15. The internal seam 15 contains an aperture 16 which is closable by a schematically illustrated check valve 17 when the head compartment 13 receives an impact exerted by the head of an occupant. In the illustrated embodiment, a cylindrical or box-like gas generator 18 having exit openings 19 and 20 at opposite ends constitutes a gas source. The gas generator is arranged approximately at the level of the horizontal axis of symmetry of the C-shaped airbag arrangement. Because the exit openings 19 and 20 are located at opposite ends of the gas generator 18, when the gas generator is activated there is at first a gas flow more or less perpendicular to the horizontal axis of symmetry. By using different types of propellant or different propellant packing densities or different gas cartridges, different filling characteristics can be established for the head compartment 13 and the torso compartment 14 of the bag arrangement. For example, the arrangement shown in FIG. 2 provides two charge packages 18a and 18b with different strength propellants. When the torso compartment 14 is used as a gas source for the head compartment 13, an appropriately adjusted reduction in the size of the gas generator 18 is possible. The resulting saving of space is accompanied by a reduction in sonic pressure because a substantially smaller volume of propellant is required to provide an adequate restraining effect.

In the embodiment of FIG. 2, a special advantage results from the fact that the fill aperture 16 establishes a certain throttling action so that the torso compartment 14 is first essentially filled rapidly by the bilateral exit flow from the gas generator 18, both toward the region of the seat cushion 2 and toward the occupant's chest region. On the other hand, the filling of the head compartment 13 then takes place after some delay. This slower filling of the head compartment 13 is consistent with sound safety engineering because the occupant's head is substantially farther from the structure of the vehicle than the chest and pelvic region so that a head impact will occur slightly later than a torso impact during a side collision.

Another advantage of the embodiment illustrated in FIG. 2 is that the force exerted by impact on the torso compartment 14 in a side collision can be utilized to fill the head compartment 13 with propellant gas from the torso compartment 14. By appropriate selection the size of the seam aperture 16, a desired inflation characteristic can also be provided for the head compartment 13, and a corresponding relaxation characteristic can be provided for the chest compartment 14.

A similar principle may also be applied in the embodiment shown in FIG. 1 if the head airbag 9 and the torso airbag 8 are connected to each other by a gas line 17a, illustrated in dotted lines, which includes a check valve 17 preferentially actuatable by the control unit 10. In response to the control unit 10, or with the aid of a delay element (not shown), the ignition of the charge packages 18a and 18b in the gas generator 18 of FIG. 2 is preferentially staggered in time so that, in addition to the more rapid filling of the torso compartment, the sonic stress on the occupant is also considerably reduced.

The airbag portions 13 and 14 of FIG. 2 are provided with vents 13a and 14a respectively which are arranged to control the relaxation behavior of the bag portions in a desired manner. Similar vents are also provided in the bags 8 and 9 of the FIG. 1 embodiment. In addition or alternatively the relaxation behavior may also be established by controlling the permeability of the particular gas cushion materials used, or supplementarily or alternatively by selection of an appropriate gas outlet throttle cross-section by the control unit 10, for example by positive control of the check valve 17.

In order to reduce the required airbag volume, the spatial projection of the torso compartment 14 and the head compartment 13 in the forward direction may also be different, depending on installation conditions, so that a correspondingly skewed C-shape configuration of the airbag arrangement results as shown in FIG. 2.

To permit improved vertical positioning of the airbags 8 and 9 and/or the airbag 12, a prepositioning arrangement is preferably provided. This assures that the module consisting of the gas generator and the airbag arrangement will first be moved from a rest position along a guide rail 22, shown in dotted lines, in the direction of an arrow 21 in FIG. 1 with airbag not yet or only partially deployed into the functional position shown in the drawings. At the lower end of the rail 22, a servo piston 23 is arranged to be actuated by a propellant device 24, for example a pyrotechnical propellant charge or a prestressed compression spring, so as to move the unit containing the airbag arrangement and the gas supply upwardly to a desired position. The prepositioning arrangement including the guide rail 22, the piston 23 and the propellant 24 is also connected to the control unit 10 so that it may be positively actuated by the control unit.

The further embodiment shown in front view in FIG. 3 illustrates the arrangement of a safety device according to the invention in a vehicle 25, only half of which is shown for the sake of clarity. In this embodiment, an occupant 27 sits on the vehicle seat 1 adjacent to a substantially vertical vehicle column 26, i.e. the so-called B-column, and is protected from the vehicle door side structure by the activated airbags 8 and 9 shown in heavy dotted lines. Additional protection from impact from a vehicle passenger on the opposite side of the occupant is provided by two further airbag portions 8' and 9' shown in light dotted lines. In this case the airbag portions 8' and 9' are shown as portions of a single airbag of the type shown in FIG. 2.

In this embodiment the housing 5a containing the propellant 5 and the airbags 8 and 9 on the door side of the occupant is mounted in an inside trim region 28 of a side door 29 of the vehicle. Alternatively or additionally a housing 5a with airbags 8' and 9' may be mounted in or associated with the headrest 4 shown in FIG. 3a, with a central tunnel 30, with a frame 31 of the seat 1, or with the column 26.

The invention is not limited to the particular embodiments shown in the drawings. Thus, depending on interior arrangement of vehicles to be equipped with a safety device according to the invention, any number of the protective arrangements described above may be combined with each other or with additional protective arrangements known to those skilled in the art. This applies especially to an accommodation of gas generators and/or airbags in the headrest 4. For example, the arrangements disclosed in German Offenlegungsschrift No. 40 19 596 may be used for the contour of the head airbag 9 or of the head airbag portion 13. Accordingly, all such variations and modifications are included within the intended scope of the invention.

We claim:

1. A safety arrangement for a vehicle occupant comprising an airbag arrangement having a first airbag compartment positioned to protect the occupant's head and a second airbag compartment positioned to protect the occupant's torso during a side collision, gas generator means actuatable in response to a signal from a collision sensor, and control means for controlling the activation of the gas generator means, wherein the gas generator means and the airbag arrangement are assembled as a unit and attached to a vehicle component or structural part and wherein the first and second airbag compartments have different filling characteristics and the first airbag compartment has a longer relaxation time than the second airbag compartment and the first and second airbag compartments, when filled with gas from the gas generator means, extend forwardly in vertically spaced relation substantially in the direction of view of the vehicle occupant and provide a substantially C-shaped contour in side view.

2. A safety arrangement according to claim 1 wherein the gas generator means comprises a housing to which the airbag arrangement is attached.

3. A safety arrangement according to claim 1 wherein the gas generator means comprises two gas generators which are separately actuatable by the control means.

4. A safety arrangement according to claim 1 wherein the airbag arrangement comprises two compartments connected by a check valve, one of the compartments being connected to the gas generator means.

5. A safety arrangement according to claim 1 wherein the airbag arrangement includes two airbag compartments joined into a single cushion.

6. A safety arrangement according 5o claim 1 wherein the unit containing the gas generator means and the airbag arrangement is mounted in a vehicle seat.

7. A safety arrangement according to claim 1 wherein the unit containing the gas generator means and the airbag arrangement is mounted in a door of the vehicle.

8. A safety arrangement according to claim 1 wherein the unit containing the gas generator means and the airbag arrangement is mounted ill a substantially vertical vehicle column.

9. A safety arrangement according to claim wherein the unit containing the gas generator means and the airbag arrangement is attached to a central tunnel of the vehicle.

10. A safety arrangement according to claim 1 wherein the unit containing the gas generator means and the airbag arrangement is attached to a frame for a back of the seat.

11. A safety arrangement according to claim 1 wherein the unit containing the gas generator means and the airbag arrangement is attached to a head support associated with the seat.

12. A safety arrangement according to claim 1 comprising at least one gas generator means and airbag arrangement assembled as a unit disposed on each side of the vehicle occupant.

13. A safety arrangement according to claim 1 including prepositioning means responsive to the control means for moving the unit containing the gas generator means and the airbag arrangement from a rest position into a restraint position prior to activation of the gas generator means.

14. A safety arrangement according to claim 1 wherein the rate of relaxation of each airbag compartment is established by selection of an airbag material having a predetermined gas permeability.

15. A safety arrangement according to claim 1 wherein each airbag compartment has a vent arrangement selected to provide a predetermined rate of relaxation.

16. A safety arrangement according to claim 1 wherein the airbag compartments include throttle means having selected cross-sections controllable by the control means to control the rate of relaxation.

17. A safety arrangement according to claim 4 including a connecting line between the airbag compartments containing a check valve which is arranged to permit filling of one of the airbag compartments and at least partly inhibiting emptying of that airbag compartment.

18. A safety arrangement according to claim 4 wherein the gas generator means includes two charge packages with different strength propellants.

19. A safety arrangement according to claim 18 wherein the gas generator means has an elongated housing with gas exit openings at opposite ends.

20. A safety arrangement according to claim 19 wherein the gas generator means is positioned approximately at the level of a horizontal axis of symmetry of the C-shaped contour, and the flow direction of the gas escaping from the gas generator after activation is initially approximately perpendicular to the axis of symmetry.

* * * * *

UNITED STATES PATENT AND TRADEMARK OFFICE
CERTIFICATE OF CORRECTION

PATENT NO. : 5,556,128
DATED : September 17, 1996
INVENTOR(S) : Sinnhuber et al.

It is certified that error appears in the above-identified patent and that said Letters Patent is hereby corrected as shown below:

Column 5, line 3, "shown" should read --as shown--;

Column 5, line 51, "5o" should read --to--;

Column 6, line 5, "ill" should read --in--;

Column 6, line 7, "claim" should read --claim 1--.

Signed and Sealed this

Eighteenth Day of March, 1997

*Attest:*

BRUCE LEHMAN

*Attesting Officer*     *Commissioner of Patents and Trademarks*